(12) United States Patent
Nunez et al.

(10) Patent No.: US 8,349,912 B2
(45) Date of Patent: *Jan. 8, 2013

(54) CROSSLINK AGENTS AND DUAL RADICAL CURE POLYMER

(75) Inventors: Ivan M. Nunez, Penfield, NY (US); Joseph A. McGee, Canandaigua, NY (US); David E. Seelye, Williamsville, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,024

(22) Filed: Sep. 12, 2011

(65) Prior Publication Data

US 2012/0004380 A1    Jan. 5, 2012

Related U.S. Application Data

(62) Division of application No. 12/168,944, filed on Jul. 8, 2008, now Pat. No. 8,053,489.

(60) Provisional application No. 60/950,993, filed on Jul. 20, 2007.

(51) Int. Cl.
*C08F 26/10* (2006.01)
*C08F 220/28* (2006.01)
*C08F 12/28* (2006.01)
*C07C 69/602* (2006.01)
*C07C 211/36* (2006.01)

(52) U.S. Cl. ........ 523/106; 525/266; 525/280; 525/282; 525/311; 525/321; 525/322; 522/99; 526/213; 526/236; 526/216; 526/263; 351/159; 351/160 R; 351/160 H

(58) Field of Classification Search ............... 525/266, 525/280, 282, 311, 321, 322; 522/99; 351/159, 351/160 R, 160 H; 523/106, 107; 526/213, 526/216, 236, 263

See application file for complete search history.

(56) References Cited

U.S. PATENT DOCUMENTS

| | | | |
|---|---|---|---|
| 3,949,021 A | 4/1976 | Kunitomo et al. | |
| 4,547,543 A | 10/1985 | Shibata et al. | |
| 4,711,943 A | 12/1987 | Harvey, III | |
| 5,070,215 A | 12/1991 | Bambury et al. | |
| 6,559,261 B1 * | 5/2003 | Milne et al. | 526/312 |
| 6,822,016 B2 | 11/2004 | McCabe et al. | |
| 7,052,131 B2 | 5/2006 | McCabe et al. | |
| 7,901,073 B2 * | 3/2011 | Nunez et al. | 351/159 |
| 8,053,489 B2 * | 11/2011 | Nunez et al. | 523/106 |
| 2003/0218717 A1 * | 11/2003 | Ichihara | 351/166 |
| 2011/0105779 A1 * | 5/2011 | Nunez et al. | 556/420 |

OTHER PUBLICATIONS

Brandrup et al., "Polymer Handbook," 3rd ed., Wiley Interscience, 1989.

* cited by examiner

*Primary Examiner* — Mark Kaucher
(74) *Attorney, Agent, or Firm* — Joseph Barrera

(57) ABSTRACT

Crosslink agents used to copolymerize at least one hydrophilic monomer with at least one lens monomer typically used to prepare polymeric materials for ophthalmic lenses. The crosslink agents have a relatively high selectivity for the hydrophilic monomer and limited reactivity with the crosslink agent used to polymerize the lens monomer. Accordingly, the invention is also directed to a hydrophilic crosslinked polymer that comprises at least two monomeric units and at least two different crosslink units. The use of the dual crosslink system provides an improved means to control the final chemical, physical and structural characteristics of the resulting polymer.

17 Claims, No Drawings

CROSSLINK AGENTS AND DUAL RADICAL CURE POLYMER

CROSS REFERENCE

This application is a divisional application of U.S. patent application Ser. No. 12/168,944 filed Jul. 8, 2008, now U.S. Pat. No. 8,053,489, which claims the benefit under 35 U.S.C. §119(e)(1) of U.S. provisional application Ser. No. 60/950,993 which was filed Jul. 20, 2007.

The present invention relates to crosslink agents and the use of the crosslink agents to provide a polymer composition. The polymer composition comprises monomeric units of two or more monomers and two or more crosslink agents. The polymer can be used as an optical polymeric material for an ophthalmic lens.

BACKGROUND OF THE INVENTION

Hydrogel contact lens materials prepared with N-vinyl-2-pyrrolidone (NVP) are expected to have a relatively high water content, and thus, an acceptable level of oxygen permeability. For example, NVP is often copolymerized with an alkyl acrylate or methacrylate such as methyl methacrylate to provide lens materials that typically have a water content of 50% to 80% by weight. However, such copolymers are difficult to synthesize in a controlled manner because of the difference in the polymerizability between the N-vinyl groups of NVP and the acryloyl or methacryloyl groups of the alkyl acrylate or methacrylate. One typically observes a phase separation and a corresponding decrease in the transparency of the polymeric lens material, or the mechanical properties of the lens material deteriorates as the lens absorbs water.

In an attempt to overcome the differences between NVP and the alkyl acrylates/methacrylates, U.S. Pat. No. 4,547,543 describes the use of N-methyl-3-methylene-2-pyrrolidone (NMMP). It is stated that NMMP has superior polymerizability with the other acrylate/methacrylate monomers, and still provides the necessary hydrophilic character desired of NVP. Accordingly, the '543 Patent describes a copolymer consisting essentially of: (a) from 50 to 95 parts by weight of the total monomer units, of which, 25 to 100 parts is NMMP and 0 to 75 parts NVP; and (b) from about 5 to about 50 parts, by weight of the total monomer units, of reinforcing monomer units consisting essentially of at least one monomer selected from the group consisting of alkyl acrylates, alkyl methacrylates, styrene, alkyl styrenes, benzyl acrylate and benzyl methacrylate.

U.S. Pat. No. 3,949,021 describes a somewhat different approach to the above mentioned problem. The '021 Patent describes trapping or encapsulating an already formed, water insoluble polymer (e.g., poly(methyl methacrylate), polystyrene, or poly(vinyl acetate) in poly(NVP). Also, U.S. patents by McCabe et al. (U.S. Pat. No. 6,822,016 and U.S. Pat. No. 7,052,131) describe a process of making a polymeric, ophthalmic lens material from a high molecular weight hydrophilic polymer and a silicone monomer. The McCabe process polymerizes the silicon monomer in the presence of an already formed hydrophilic polymer, e.g., poly(NVP) having a molecular weight of no less than about 100,000 Daltons.

Conventional polymer formulations that include two or more free-radical, monomers with two very different reactivity ratios and a single crosslinking agent can provide a polymer in which the two monomers coexist as essentially two homopolymers. During the initial stages of the polymerization reaction one monomer preferentially reacts with the crosslink agent, and only after that monomer is nearly consumed does the second monomer begin to react with the crosslink agent. In some instances, the large difference in the reactivity ratios of the crosslink agent and the second monomer can provide a polymer with relatively large amounts of unreacted second monomer or oligomer, which then must be extracted from the polymer. This is very inefficient in terms of production cost (yields) and can be detrimental to the material properties. Also, it is often difficult to repeatedly produce a polymer within design specifications under such variable reaction conditions.

The theoretical composition of the polymer formed by the reaction of two different monomers (one of which is a crosslink agent) is determined by the following:

$$dn_1/dn_2 = (N_1/N_2)(r_1 N_1 + N_2)/(r_2 N_2 + N_1)$$

where $n_1$ is the moles of monomer 1 in the copolymer, $n_2$ is the moles of monomer 2 in the copolymer, $N_1$ and $N_2$ are the number of moles of monomers 1 and 2, respectively, in the monomer mixture, and $r_1$ and $r_2$ are the monomer reactivity ratios. The reactivity ratios are defined in terms of propagation rate constants, $k_{11}$, $k_{12}$, $k_{22}$ and $k_{21}$, according to the following polymerization reactions.

$$M_1^* + M_1 \rightarrow M_1 M_1^* \; k_{11}$$

$$M_1^* + M_2 \rightarrow M_1 M_2^* \; k_{12}$$

$$M_2^* + M_2 \rightarrow M_2 M_2^* \; k_{22}$$

$$M_2^* + M_1 \rightarrow M^2 M_1^* \; k_{21},$$

and $r_1 = k_{11}/k_{12}$ and $r_2 = k_{22}/k_{21}$.

The invention overcomes the shortcomings that result from attempts to copolymerize at least two monomers with a single crosslink agent if one of the two monomers has a very different reactivity ratio relative to the crosslink agent.

SUMMARY OF THE INVENTION

The invention is directed to a compound of general formula I

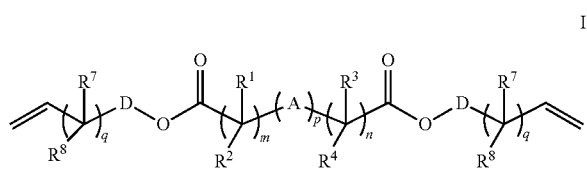

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is O, O(CH$_2$CH$_2$O)$_v$ or [SiR$^5$R$^6$O]$_w$SiR$^5$R$^6$, wherein $R^5$ and $R^6$ are independently selected from $C_1$-$C_4$alkyl or phenyl, and v is from 1-20 and w is from 0 to 60;

D is a straight or branched alkyl with two to eight carbons or a cyclic hydrocarbon with five to eight ring carbons, wherein one or two of the alkyl or ring carbon atoms is optionally substituted for an oxygen atom, sulfur atom or nitrogen radical; and m and n are integers independently selected from 1 to 10; p is 0 or 1; and q is an integer from 0 to 6.

The invention is also directed to a compound of general formula III

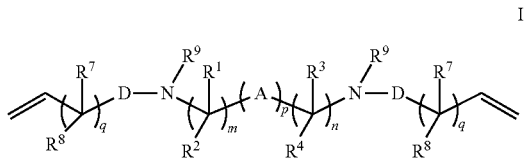

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl, and $R^9$ is selected from hydrogen, $C_1$-$C_4$alkyl or $C_1$-$C_3$alkanol;

A is O, $O(CH_2CH_2O)_v$ or $[SiR^5R^6O]_wSiR^5R^6$, wherein $R^5$ and $R^6$ are independently selected from $C_1$-$C_4$alkyl or phenyl, and v is from 1-20 and w is from 0 to 60;

D is a straight or branched alkyl with two to eight carbons or a cyclic hydrocarbon with five to eight ring carbons, wherein one or two of the alkyl or cyclic carbon atoms is optionally substituted for an oxygen atom, sulfur atom or nitrogen radical; and m and n are integers independently selected from 1 to 10; p is 0 or 1; and q is an integer from 0 to 6.

The invention is also directed to a polymer comprising the reaction product of two or more crosslink agents, a hydrophilic monomer and a lens monomer, and at least one of the crosslink agents is of general formula I or general formula III as defined above. The polymers can be used to form an ophthalmic lens.

The invention is also directed to a polymer prepared by a process of providing a polymerization mixture that comprises a hydrophilic monomer that has a reactivity ratio $R_h = k_{hh}/k_{hx}$, a crosslink agent of general formula I or general formula III as defined above, wherein $k_{hh}$, $k_{hx}$, $k_{xx}$ and $k_{xh}$ are the propagation constants for the following radical polymerization reactions, and $M_h$ represents the hydrophilic monomer, $M_h^*$ represents the hydrophilic monomer radical, $M_x$ represents the crosslink agent of general formula I or general formula III, and $M_x^*$ represents the crosslink agent radical of general formula I or general formula III,

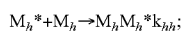

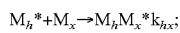

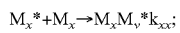

the ratio, $R_h/R_x$, is from 0.1 to 10, wherein $R_x$ is $k_{xx}/k_{xh}$. The polymerization mixture also comprises a lens monomer that has a reactivity ratio $R_1 = k_{ll}/k_{ly}$, and a crosslink agent that has a reactivity ratio $R_y = k_{yy}/k_{yl}$, wherein $k_{ll}$, $k_{ly}$, and $k_{yl}$, are the propagation constants for the following radical polymerization reactions, and $M_1$ represents the lens monomer, $M_1^*$ represents the lens monomer radical, $M_y$ represents the crosslink agent, and $M_y^*$ represents the crosslink agent radical,

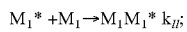

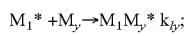

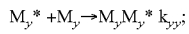

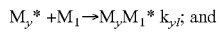

the ratio, $R_1/R_y$, is from 0.1 to 10. The resulting polymer can be used to form an ophthalmic lens.

DETAILED DESCRIPTION OF THE INVENTION

The invention provides a synthetic route to polymers comprised of at least two monomers, and in particular, at least two vinyl monomers, each with a very different reactivity ratio by using a corresponding crosslink agent for each monomer. Novel crosslink agents are described that allow one to copolymerize at least one hydrophilic monomer, e.g., any N-vinyl lactam, with at least one conventional monomer used to prepare polymeric materials for ophthalmic lenses. Hereafter, we will refer to a conventional monomer, some of which are described below, as a "lens monomer". The new crosslink agents have a relatively high selectivity for the hydrophilic monomer and limited reactivity with the crosslink agent used to polymerize the lens monomer.

The invention is directed to a method of making a hydrophilic crosslinked polymer that comprises at least two monomeric units and at least two different crosslink units. Again, the two different crosslink agents are required because the at least one hydrophilic monomer and the at least one lens monomer do not readily copolymerize with a single crosslink agent. The use of a corresponding crosslink agent for each of the hydrophilic monomer and the lens monomer ensures a mutually compatible polymer. As a result, the amount of hydrophilic monomer or hydrophilic oligomer that is extractable following the polymerization reaction is significantly reduced. The use of the dual crosslink system also provides an improved means to control the final chemical, physical and structural characteristics of the resulting polymer.

The invention is directed to a compound of general formula I

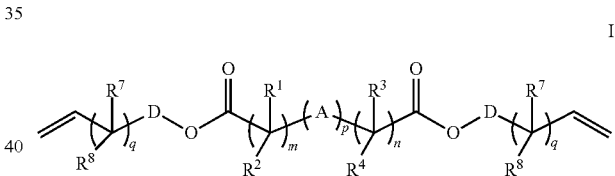

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is O, $O(CH_2CH_2O)$, or $[SiR^5R^6O]_wSiR^5R^6$, wherein $R^5$ and $R^6$ are independently selected from $C_1$-$C_4$alkyl or phenyl, and v is from 1-20 and w is from 0 to 60;

D is a straight or branched alkyl with two to eight carbons or a cyclic hydrocarbon with five to eight ring carbons, wherein one or two of the alkyl or cyclic carbon atoms is optionally substituted for an oxygen atom, sulfur atom or nitrogen radical; and m and n are integers independently selected from 1 to 10; p is 0 or 1; and q is an integer from 0 to 6.

The terms "straight or branched alkyl" and "cyclic hydrocarbon" are aliphatic radicals that can include one or more non-carbon substituent groups, e.g., hydroxyl, amine, carboxy acid, ester or ether.

In one embodiment, D is a hydroxy-substituted cycloalkyl or a hydroxyl substituted, straight or branched alkyl. In many instances, the hydroxyl is formed from the corresponding epoxide used in the preparation of the compound. Also, in many instances p is 0, m+n is from 4 to 10 and $R^1$, $R^2$, $R^3$ and $R^4$ are hydrogen. For example, compounds that are embodied by general formula I include compounds of general formula II, wherein k is 1 to 12 and q is 0, 1 or 2.

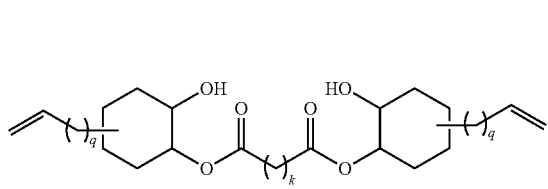

II

The crosslink agents of general formula I can also be used to copolymerize a hydrophilic monomer with a silicon monomer or macromonomer. In such a case, it may be advantageous to prepare crosslink agents with a siloxane backbone, that is where A is $[SiR^5R^6O]_w SiR^5R^6$, and m+n is from 2 to 10.

Alternatively, if greater hydrophilic character is desired, it may be advantageous to prepare crosslink agents with an oxyethylene backbone, that is where p is 1, A is $O(CH_2CH_2O)_v$ and m+n is from 2 to 10.

The invention is also directed to a compound of general formula III.

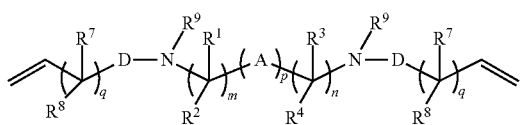

III wherein $R^1$, $R^2$, $R^3$, $R^4$, $R^7$ and $R^8$ are independently selected from hydrogen, $C_1C_4$alkyl, $C_1$-$C_2$alkanol or hydroxyl; and $R^9$ is independently selected from hydrogen, $C_1$-$C_4$alkyl or $C_1$-$C_3$alkanol;

A is O, O $(CH_2CH_2O)_v$ or $[SiR^5R^6O]_w SiR^5R^6$, wherein $R^5$ and $R^6$ are independently selected from $C_1$-$C_4$alkyl or phenyl, and v is from 1-20 and w is from 0 to 60;

D is a straight or branched alkyl with two to eight carbons or a cyclic hydrocarbon with five to eight ring carbons, wherein one or two of the alkyl or cyclic carbon atoms is optionally substituted for an oxygen atom, sulfur atom or nitrogen radical; and m and n are integers independently selected from 1 to 10; p is 0 or 1; and q is an integer from 0 to 6.

The crosslink agents of general formula III can also be used to copolymerize a hydrophilic monomer with a silicon monomer or macromonomer. In such a case, it may be advantageous to prepare crosslink agents with a siloxane backbone, that is where A is $[SiR^5R^6O]_w SiR^5R^6$, and m+n is from 2 to 10.

Alternatively, if greater hydrophilic character is desired, it may be advantageous to prepare crosslink agents with an oxyethylene backbone, that is where p is 1, A is $O(CH2CH2O)_v$ and m+n is from 2 to 10.

In one embodiment, D is a hydroxy-substituted cyclohexane or a hydroxyl substituted, straight or branched alkyl. Again, the hydroxyl is formed from the corresponding epoxide used in the preparation of the compound. Also, in many instances p is 0, m+n is from 4 to 10 and $R^1$, $R^2$, $R^3$ and $R^4$ are hydrogen. For example, one compound that is embodied by the above description is depicted as general formula IV wherein k is 1 to 12 and q is 0, 1 or 2.

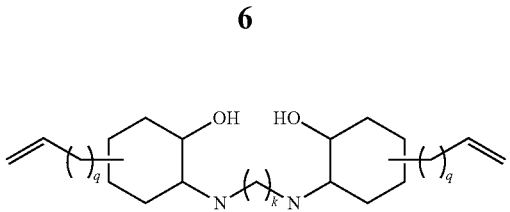

IV

The described method of copolymerizing a hydrophilic monomer with a lens monomer in the presence of a crosslink agent of general formula I, general formula II general formula III or general formula IV provides certain advantages if the hydrophilic vinyl monomer is a N-vinyl lactam, particularly a N-vinyl lactam selected from the group consisting of N-vinyl pyrrolidone, N-vinyl piperidone and N-vinyl-ε-caprolactam, and mixtures thereof. The N-vinyl lactams are known to be notoriously sluggish in free radical polymerization reactions with many of the more common acrylate-, methacrylate-or acrylamide-based monomers. Particularly, those acrylate-, methacrylate- or acrylamide-based monomers typically used to provide polymer materials for ophthalmic lenses such as 2-hydroxyethyl methacrylate (HEMA), tris-(trimethylsiloxy)-3-methacryloxypropylsilane (TRIS), dimethylacrylamide (DMA), ethylene glycol dimethacrylate (EGDMA), methacrylic acid (MA), 2-phenylethyl acrylate, 2-phenoxyethyl acrylate, 2-phenoxyethyl methacrylate, triethylene glycol dimethacrylate, tetraethylene glycol dimethacrylate, isobornyl methacrylate, 2-methoxyethyl methacrylate, glycerol monomethacrylate, monomethoxy polyethyleneglycol (PEG) methacrylates.

For example, previous attempts to copolymerize NVP with any one or more of the lens monomers listed above invariably results in formation of an acrylate, a methacrylate or an acrylamide polymer with very little NVP incorporation. Instead, most of the NVP present in the polymer is present as non-covalently attached homopolymer chains of poly(NVP). These poly(NVP) chains tend to leach out from the polymer over time. The leaching of the poly(NVP) reduces the hydrophilic character of the polymer, and a reduction in water content or wettability is observed with the polymer. Moreover, attempts to copolymerize NVP with one or more siloxane macromonomers described below can lead to a phase separation, and in the case of an ophthalmic lens such phase separation can lead to opacification of the lens material.

Table 1 lists the reactivity ratios for NVP (monomer 1) and vinyl monomers (monomer 2) that are typically used to make ophthalmic lens materials. These reactivity ratios are taken from J. Brandrup and E. J. Immergut, "Polymer Handbook", $3^{rd}$ Ed. Wiley Interscience (1989).

TABLE 1

| Reactivity Ratios for NVP. | | |
|---|---|---|
| monomer 2 | $r_1$ | $r_2$ |
| 2-hydroxyethyl methacrylate | −0.019 | 4.841 |
| styrene | 0.057 | 17.20 |
| methyl methacrylate | 0.010 | 4.04 |
| vinyl cyclohexyl ether | 1.91 | −0.110 |
| vinyl isopropyl ether | 0.870 | 0.030 |
| vinyl butyl ether | 1.49 | 0 |
| vinyl benzoate | 2.507 | 0.408 |
| vinyl acetate | 0.340 | 0.195 |
| N-vinyl caprolactam | 2.8 | 1.7 |
| N-vinyl-t-butyl carbamate | 0.4 | 2.4 |
| AMPS | 0.13 | 0.66 |

AMPS: 2-Acrylamido-2-methyl-1-propanesulfonic acid sodium salt:

The method of the invention is particularly useful to copolymerize a hydrophilic monomer and a lens monomer. Accordingly, the invention is directed a polymer prepared by a process of providing a polymerization mixture that comprises a hydrophilic monomer that has a reactivity ratio $R_h = k_{hh}/k_{hx}$, a crosslink agent of general formula I or general formula III as defined above, wherein $k_{hh}$, $k_{hx}$, $k_{xx}$ and $k_{xh}$ are the propagation constants for the following radical polymerization reactions, and $M_h$ represents the hydrophilic monomer, $M_h^*$ represents the hydrophilic monomer radical, $M_x$ represents the crosslink agent of general formula I or general formula III, and $M_x^*$ represents the crosslink agent radical of general formula I or general formula III,

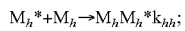

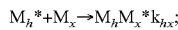

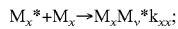

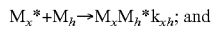

the ratio, $R_h/R_x$, is from 0.1 to 10, wherein $R_x$ is $k_{xx}/k_{xh}$. The polymerization mixture also comprises a lens monomer that has a reactivity ratio $R_1 = k_{ll}/k_{ly}$, and a crosslink agent that has a reactivity ratio $R_y = k_{yy}/k_{yl}$, wherein $k_{ll}$, $k_{yy}$, and $k_{yl}$ are the propagation constants for the following radical polymerization reactions, and $M_1$ represents the lens monomer, $M_1^*$ represents the lens monomer radical, $M_y$ represents the crosslink agent, and $M_y^*$ represents the crosslink agent radical,

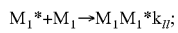

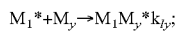

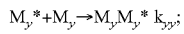

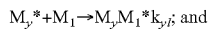

the ratio, $R_1/R_y$, is from 0.1 to 10. The resulting polymer can be used to form an ophthalmic lens.

In the preparation of many of the polymerization mixtures the hydrophilic monomer and the lens monomer will typically have a relatively large reactivity difference. In other words, if one were to define a reactivity ratio, $R_H/R_L$, based on a similar set of polymerization reactions shown below (the crosslink agent being the same a single crosslink system), the reactivity ratio should be large, i.e., a 10-fold difference (e.g., greater than 10 or less than 0.1). Accordingly, the hydrophilic monomer and the lens monomer have a reactivity ratio, $R_H/R_L$, greater than 10 or less than 0.1, the reactivity ratio, $R_H/R_L$, is defined by the following radical polymerization reactions, wherein $M_h$ represents the hydrophilic monomer, $M_h^*$ represents the hydrophilic monomer, $M_1$ represents the lens monomer, $M_1^*$ represents the lens monomer radical, $M_i$ represents the crosslink agent, and $M_i^*$ represents the crosslink agent radical,

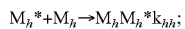

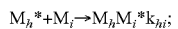

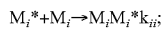

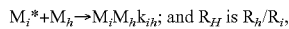

and

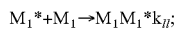

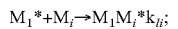

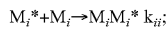

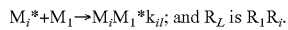

Accordingly, in one embodiment, the hydrophilic monomer is a N-vinyl lactam selected from the group consisting of N-vinyl pyrrolidone, N-vinyl piperidone and N-vinyl-ϵ-caprolactam and mixtures thereof. Other suitable hydrophilic monomers include N-vinylimidazolidone and N-vinylsuccinimide. In many instances, however, the hydrophilic monomer will be N-vinyl pyrrolidone.

Exemplary monomers that are copolymerized with the one or more hydrophilic monomers include acrylate-, methacrylate- or acrylamide-based monomers. Particularly, those acrylate-, methacrylate- or acrylamide-based monomers typically used to provide polymer materials for ophthalmic lenses such as HEMA, TRIS, DMA, EGDMA, MA, 2-phenylethyl acrylate, 2-phenoxyethyl acrylate, 2-phenoxyethyl methacrylate, triethylene glycol dimethacrylate, tetraethylene glycol dimethacrylate, isobornyl methacrylate, 2-methoxyethyl methacrylate, glycerol monomethacrylate, monomethoxy polyethyleneglycol (PEG) methacrylates The described method is also particularly useful for the preparation of polymeric silicon hydrogels. In this instance, one or more siloxane macromonomers described below are polymerized with the hydrophilic monomer. In some instances, there can be an advantage of inserting a siloxane linkage in the crosslink agent, that is, A is [SiR$^5$R$^6$O]$_s$SiR$^5$R$^6$ and p is 1 according to general formula I or of general formula III, for the synthesis of a silicon hydrogel.

1. The Use of the Crosslinking Agent to Make Contact Lens Materials.

Any one or more of known silicon-containing monomers or macromonomers can be combined with the hydrophilic monomer and a crosslink agent of general formula I, general formula II, general formula III or general formula IV to provide a monomer mixture that is then polymerized to provide a siloxane polymer for the manufacture of an ophthalmic lens material.

A particular silicon monomer that can be used is of Structure A.

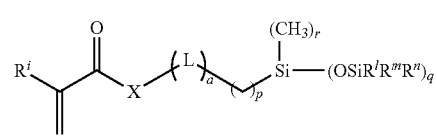

wherein $R^i$ is H or CH$_3$, q is 1 or 2 and for each q, $R^1$, $R^m$ and $R^n$ are independently selected from ethyl, methyl, benzyl, phenyl or a monovalent siloxane chain comprising from 1 to 30 repeating Si—O units, p is an integer from 1 to 10, r=(3-q), X is O, NH or N(C$_{1-4}$alkyl), a is 0 or 1, and L is a divalent linking group which preferably comprises from 2 to 5 carbons, which may also optionally comprise ether or hydroxyl groups, for example, a poly(ethylene glycol) chain.

Examples of the silicone-containing monomers of Structure A that can be used are (3-methacryloyloxypropyl)bis(trimethylsiloxy)methylsilane, (3-methacryloyloxypropyl)pentamethyldisiloxane, (3-methacryloyloxy-2-hydroxypropyloxy)bis(trimethylsiloxy) methylsilane. Preferred silicone-containing monomers are monomethacryloyloxyalkyl-terminated polydimethylsiloxanes ("mPDMS"), such as those shown in structure B.

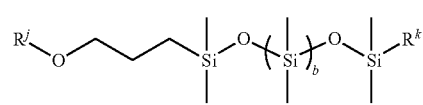

where b=0 to 100, and $R^k$ is any $C_{1-10}$ aliphatic or aromatic group which can include hetero atoms; provided that $R^k$ is not functionalized at the point at which it is bonded to Si. Preferably, $R^k$ is a $C_{3-8}$ alkyl groups with butyl groups, particularly sec-butyl groups, being most preferred. $R^j$ is an ethylenically unsaturated moiety; preferably a single polymerizable vinyl group. More preferably, $R^j$ is a methacryl moiety but it can also be an acryl or styrenic moiety or other similar moiety.

Other silicon-containing monomers that can be used include (3-methacryloxypropyl)tris(trimethylsiloxy)silane (TRIS), amide analogs of TRIS described in U.S. Pat. No. 4,711,943, and the vinylcarbamate or carbonate analogs described in U.S. Pat. No. 5,070,215.

Examples of some other silicon-containing monomers include bulky polysiloxanylalkyl (meth)acrylic monomers. An example of bulky polysiloxanylalkyl (meth)acrylic monomers are represented by Structure C:

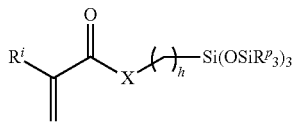

C wherein X denotes O or $NR^i$; h is an integer from 1 to 10; each $R^i$ independently denotes hydrogen or methyl; and each $R^p$ independently denotes a lower alkyl radical or phenyl radical.

Another class of representative silicon-containing monomers includes silicone-containing vinyl carbonate or vinyl carbamate monomers such as:

1,3-bis[4-vinyloxycarbonyloxy)but-1-yl]tetramethyldisiloxane;
1,3-bis[4-vinyloxycarbonyloxy)but-1-yl]polydimethylsiloxane;
3-(trimethylsilyl)propyl vinyl carbonate;
3-(vinyloxycarbonylthio)propyl-[tris(trimethylsiloxy)silane];
3-[tris(trimethylsiloxy)silyl]propyl vinyl carbamate;
3-[tris(trimethylsiloxy)silyl]propyl allyl carbamate;
3-[tris(trimethylsiloxy)silyl]propyl vinyl carbonate;
t-butyldimethylsiloxyethyl vinyl carbonate;
trimethylsilylethyl vinyl carbonate; and trimethylsilylmethyl vinyl carbonate.

Examples of silicon-containing vinyl carbonate or vinyl carbamate monomers are represented by Structure D:

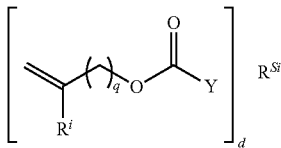

D wherein:
Y denotes O, S or NH;
$R^{Si}$ denotes a silicone-containing organic radical;
$R^i$ denotes hydrogen or methyl;
d is 1, 2, 3 or 4; and q is 0 or 1.

Suitable silicone-containing organic radicals $R^{Si}$ include the following: $—(CH_2)_nSi[(CH_2)_mCH_3]_3$; $—(CH_2)_nSi[OSi(CH_2)_mCH_3]_3$; $—(CH_2)_nSi[OSi(R')_3]_3$; $—(CH_2)_n[Si(R')_2O]_eSi(R')_3$; and $—(CH_2)_n[Si(R')_2O]_eM$, wherein: M is represented by

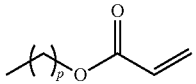

wherein p is 1 to 6;
$R'$ denotes an alkyl radical or a fluoroalkyl radical having 1 to 6 carbon atoms;
e is an integer from 1 to 200; n is 1, 2, 3 or 4; and m is 0, 1, 2, 3, 4 or 5.

An example of a particular species within Structure D is represented by Structure E.

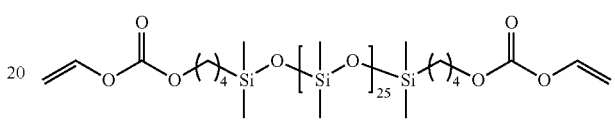

E

Another class of silicon-containing monomers includes polyurethane-polysiloxane macromonomers (also sometimes referred to as prepolymers), which may have hard-soft-hard blocks like traditional urethane elastomers. Examples of silicone urethane monomers are represented by general Formulae IV and V:

$$E(*D*A*D*G)_a*D*A*D*E; \text{ or} \qquad (IV)$$

$$E(*D*G*D*A)_a*D*G*D*E'; \qquad (V)$$

wherein:
D denotes an alkyl diradical, an alkyl cycloalkyl diradical, a cycloalkyl diradical, an aryl diradical or an alkylaryl diradical having 6 to 30 carbon atoms;
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
a is at least 1;
A denotes a divalent polymeric radical of Structure F:

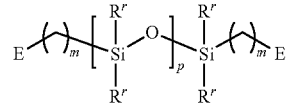

F wherein:
each $R^r$ independently denotes an alkyl or fluoro-substituted alkyl group having 1 to 6 carbon atoms which may contain ether linkages between carbon atoms;
m is at least 1; and
p is a number which provides a moiety weight of 400 to 10,000;
E denotes a polymerizable unsaturated organic radical represented by Structure G:

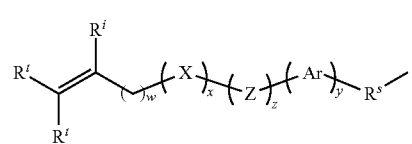

G wherein:

$R^i$ is hydrogen or methyl;

$R^1$ is hydrogen, an alkyl radical having 1 to 6 carbon atoms, or a —CO—Y—$R^u$ radical wherein Y is O, S or NH;

$R^s$ is a divalent alkylene radical having 1 to 10 carbon atoms;

$R^u$ is a alkyl radical having 1 to 12 carbon atoms;

X denotes CO or OCO;

Z denotes O or NH;

Ar denotes an aromatic radical having 6 to 30 carbon atoms;

w is an integer from 0 to 6; x is 0 or 1; y is 0 or 1; and z is 0 or 1.

An example of another silicon-containing monomer that can be combined with a silicone/epoxy-containing monomer are shown by Structure J

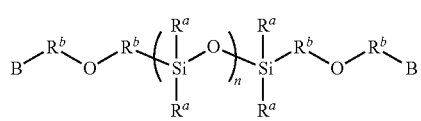

J wherein B is represented by

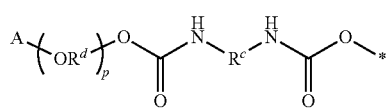

and A is represented by

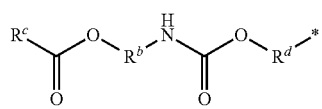

and wherein: $R^a$ independently denote a $C_1$-$C_6$ alkyl; $R^b$ independently denotes a $C_1$-$C_6$ alkylene; $R^c$ independently denote a linear or branched alkylene; $R^d$ independently denote a $C_1$-$C_2$ alkylene; $R^e$ independently denotes a $C_1$-$C_6$ alkylene; m and p are integers independently selected form the integers from 3 to 44; and n is an integer from 13 to 80, and the silicon-containing monomer has a number-average molecular weight of 2000 to 10,000.

A more specific example of a silicone-containing urethane monomer is represented by Structure H.

wherein m is at least 1 and is preferably 3 or 4, a is at least 1 and preferably is 1, p is an integer which provides a moiety weight of 400 to 10,000 and is preferably at least 30, $R_{10}$ is a diradical of a diisocyanate after removal of the isocyanate group, such as the diradical of isophorone diisocyanate, and each E" is a group represented by:

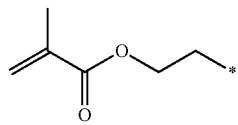

The silicone hydrogels after hydration of the polymers will typically comprise from 10 to 60 weight percent water, or 25 to about 50 weight percent water, of the total weight of the silicone hydrogel.

The silicon hydrogel materials can also be characterized as having low haze, good wettability and modulus. Haze is measured by placing test lenses in saline in a clear cell above a black background, illuminating from below with a fiber optic lamp at an angle 66° normal to the lens cell, and capturing an image of the lens from above with a video camera. The background-subtracted scattered light image is quantitatively analyzed, by integrating over the central 10 mm of the lens, and then compared to a −1.00 diopter CSI Thin Lens®, which is arbitrarily set at a haze value of 100, with no lens set as a haze value of 0.

Wettability is measured by measuring the dynamic contact angle or DCA at 23° C. with borate buffered saline, using a Wilhelmy balance. The wetting force between the lens surface and borate buffered saline is measured using a Wilhelmy microbalance while the sample is being immersed into or pulled out of the saline. The following equation is used $$F = 2\gamma\rho \cos\theta$$

where F is the wetting force, $\gamma$ is the surface tension of the probe liquid, $\rho$ is the perimeter of the sample at the meniscus and $\theta$ is the contact angle. Typically, two contact angles are obtained from a dynamic wetting experiment, i.e., the advancing contact angle and the receding contact angle. The advancing contact angle is obtained from the portion of the wetting experiment where the sample is being immersed into the test liquid. At least four lenses of each composition are measured and the average is reported.

The silicon hydrogel materials have a modulus of at least about 30 psi, preferably from 30 psi to 110 psi, or between 40 psi and 70 psi. Modulus is measured by using the crosshead of a constant rate of movement type tensile testing machine equipped with a load cell that is lowered to the initial gauge height. A suitable testing machine includes an Instron model

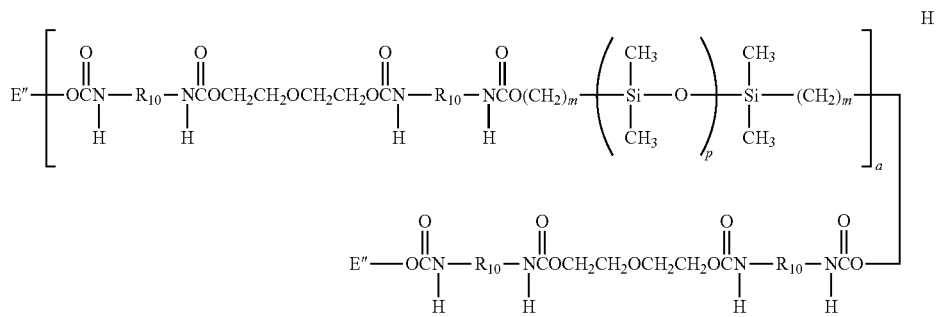

1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Tensile modulus is measured at the initial linear portion of the stress/strain curve.

The silicon hydrogel materials have $O_2Dk$ values between 40 barrer and 300 barrer, determined by the polarographic method. Lenses are positioned on the sensor then covered on the upper side with a mesh support. The lens is exposed to an atmosphere of humidified 21wt % oxygen. The oxygen that diffuses through the lens is measured using a polarographic oxygen sensor consisting of a 4 mm diameter gold cathode and a silver ring anode. The reference values are Balafilcon A lenses (Bausch & Lomb) which have a Dk value of about 80 barrer.

2. The Use of the Crosslinking Agent to Make Intraocular Lens Materials.

For application as an intraocular lens, polymeric materials are prepared with the crosslink agent of general formula I, or of general formula II, a hydrophilic monomer and a lens monomer. The resulting polymer is of sufficient optical clarity, and will have a relatively high refractive index of approximately 1.40 or greater.

An exemplary listing of lens monomers include: $C_1$-$C_{10}$ alkyl methacrylates (e.g., methyl methacrylate, ethyl methacrylate, propyl methacrylate, butyl methacrylate, octyl methacrylate, or 2-ethylhexyl methacrylate; $C_1$-$C_{10}$ alkyl acrylates (e.g., methyl acrylate, ethyl acrylate, propyl acrylate, n-butyl acrylate, n-hexyl acrylate, 2-ethylhexyl acrylate or 2-ethoxyethyl acrylate; $C_6$-$C_{40}$ arylalkyl acrylates (e.g., 2-phenylethyl acrylate, 2-phenoxyethyl acrylate, 2-phenoxyethyl methacrylate, benzyl acrylate, 3-phenylpropyl acrylate, 4-phenylbutyl acrylate, 5-phenylpentyl acrylate, 8-phenyloctyl acrylate, or 2-phenylethoxy acrylate; and $C_6$-$C_{40}$ arylalkyl methacrylates (e.g., 2-phenylethyl methacrylate, 3-phenylpropyl methacrylate, 4-phenylbutyl methacrylate, 5-phenylpentyl methacrylate, 8-phenyloctyl methacrylate, 2-phenoxyethyl methacrylate, 3,3-diphenylpropyl methacrylate, 2-(1-naphthylethyl) methacrylate, benzyl methacrylate, or 2-(2-naphthylethyl) methacrylate.

Alternatively, the $C_6$-$C_{40}$ arylalkyl acrylates can be defined by the following formula:

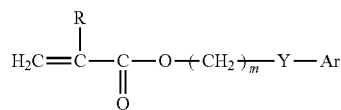

wherein: R is H or $CH_3$; m is 0-10;

Y is nothing, O, S, or NR wherein R is H, $CH_3$ or another lower alkyl, iso-$OC_3H_7$, phenyl or benzyl;

Ar is any aromatic ring, e.g., phenyl, which can be unsubstituted or substituted with H, $CH_3$, $C_2H_5$, n-$C_3H_7$, iso-$C_3H_7$, $OCH_3$, $C_6H_{11}$, Cl, Br or OH.

Reinforced cross-linked silicone elastomers can be prepared with the crosslink agent of general formula I, or of general formula II, and a hydrophilic vinyl monomer. These silicon elastomers will include a siloxane polymer containing 12 to 18 mol percent of aryl substituted siloxane units of the formula $R^4R^5$—SiO. In the formula, $R^4$ and $R^5$ are the same or different and represent phenyl, mono- lower alkyl substituted phenyl groups, or di- lower alkyl substituted phenyl groups. Preferably both $R^4$ and $R^5$ are phenyl. The siloxane polymer will have end blockers containing siloxane units of the formula $R^1R^2R^3$—$SiO_5$ wherein $R^1$ and $R^2$ are alkyl, aryl or substituted alkyl or substituted aryl groups, and $R^1$ and $R^2$ can be the same or different. The $R^3$ group of the end blocking siloxane units is an alkenyl group. Preferably, the end blocker is a dimethylvinyl siloxane unit.

The balance of the polymer consists of dialkyl siloxane units of the formula $R^6R^7$—SiO wherein $R^6$ and $R^7$ are the same or different from and are methyl or ethyl groups, and the polymer has a degree of polymerization from 100 to 2000. Preferably, $R^6$ and $R^7$ are both methyl, and the degree of polymerization is approximately 250.

A trimethyl silyl treated silica reinforcer is finely dispersed in the polymer, in a weight ratio of approximately 15 to 45 parts of the reinforcer to 100 parts of the polymer. Preferably, there is approximately 27 parts of reinforcer to 100 parts of the copolymer.

Polymeric materials prepared with the crosslink agent of general formula I, or of general formula II, and a hydrophilic vinyl monomercan be prepared by polymerizing the following monomeric components:

(A) 5% to 25% by weight of acrylate represented by the general formula

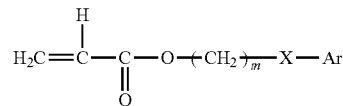

wherein Ar represents an aromatic ring of which hydrogen atom may be substituted by a substitutional group, X represents an oxygen atom or a direct bonding, and m represents an integer from 1 to 5;

(B) 50% to 90% by weight of 2-hydroxyethyl (meth)acrylate; and (C) 5% to 45% by weight of a (meth)acrylate monomer though not of the formula that represent monomer (A) and not 2-hydroxyethyl (meth)acrylate. Also, the coefficient of water absorption of the homopolymer of monomer (C) is not more than 30% by weight. The coefficient of water absorption ($H2O_{abs.}$%) is defined as the following equation: $H_2O_{abs.}$%= $[(W_h-W_d)/W_d] \times 100$ wherein the value is calculated at 25° C. by using a sample 1 mm thick; $W_h$ represents a weight (g) of the sample in an equilibrium state with water, and $W_d$ represents a weight (g) of the sample in a dry state. The water content (% Water) is given by the following formula:

$$\% \text{ Water} = [(W_h - W_d)/W_h] \times 100$$

An exemplary listing of (meth)acrylate monomer (C) include an alkyl (meth)acrylate containing a straight chain, a branched chain or cyclic chain such as methyl (meth)acrylate, ethyl (meth)acrylate, propyl (meth)acrylate, butyl (meth) acrylate, pentyl (meth)acrylate, hexyl (meth)acrylate, heptyl (meth)acrylate, nonyl (meth)acrylate, stearyl meth)acrylate, octyl (meth)acrylate, decyl (meth)acrylate, lauryl (meth) acrylate, pentadecyl (meth)acrylate, 2-ethylhexyl (meth) acrylate, cyclopentyl (meth)acrylate, (meth)acrylate, cyclohexyl (meth)acrylate: an alkyl (meth)acrylate containing 1 to 5 carbon atoms of alkyl group: a hydroxyalkyl (meth)acrylate containing a straight chain, a branched chain or cyclic chain, except for 2-HE(M)A (B), and any mixture thereof. Among the alkyl methacrylates those containing 1 to 3 carbon atoms of alkyl group are preferred. Among the hydroxyalkyl methacrylates those containing 3 to 6 carbon atoms of hydroxyalkyl group are preferred.

Polymeric materials can be prepared with a crosslink agent general formula I, general formula II or general formula III, and a hydrophilic vinyl monomer by copolymerizing a specific monomer mixture comprising perfluorooctylethyloxypropylene (meth)acrylate, 2-phenylethyl (meth)acrylate, and an alkyl (meth)acrylate monomer having the following general formula,

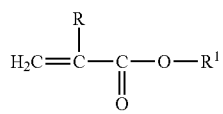

wherein R is hydrogen or methyl and $R^1$ is a linear or branched $C_4$-$C_{12}$ alkyl group. The perfluorooctylethyloxypropylene (meth)acrylate is present from 5% to 20% by weight, the 2-phenylethyl (meth)acrylate is present from 40% to 60% by weight, the alkyl (meth)acrylate monomer is present from 30% to 50% by weight and the crosslinking agent is present from 0.5% to 4% by weight.

The above described polymeric materials are prepared by generally conventional polymerization methods from the respective monomeric components. A polymerization mixture of the monomers in the selected amounts is prepared. To this mixture is added a crosslink agent of general formula I, or of general formula II, at least one other crosslink agent particularly suited for an acrylate- methacrylate- or acrylamide-based monomer and a conventional thermal free-radical initiator. The mixture is introduced into a mold of suitable shape to form the optical material and the polymerization initiated by gentle heating. Typical thermal, free radical initiators include peroxides, such as benzophenone peroxide, peroxycarbonates, such as bis-(4-t-butulcyclohexyl) peroxydicarbonate, azonitriles, such as azobisisobytyronitrile, and the like. A preferred initiator is bis-(4-t-butylcyclohexyl) peroxydicarbonate (PERK).

Alternatively, the monomers can be photopolymerized by using a mold which is transparent to actinic radiation of a wavelength capable of initiating polymerization of these acrylic monomers and crosslink agents. Conventional photoinitiator compounds, e.g., a benzophenone-type photoinitiator, can be introduced to facilitate the photo-polymerization.

EXAMPLE 1

Synthesis of X-linker
Bis(2-hydroxy-5-vinyl-cyclohexyl) Suberate

Scheme 1

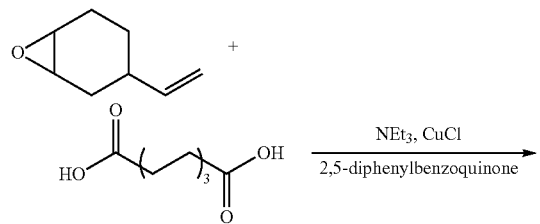

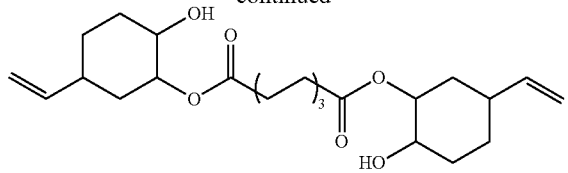

As shown in scheme 1, the reagents, 4-vinyl-1-cyclohexene-1,2-epoxide (12.4 g, 0.1 moles), suberic acid (13.7 g, 0.07 moles), triethylamine (15.9 g, 0.016 moles) and toluene (60 mL) were combined in a reaction flask equipped with a stir bar, water condenser and drying tube. Cuprous chloride and 2,5-diphenylbenzoquinone (200-500 ppm) were added to inhibit polymerization. The temperature of the reaction flask was controlled with a thermal heating unit. The reaction mixture was heated to 90° C., and the progress of the reaction monitored by gas chromatography (GC). After about 5 hours the epoxide could not be detected by GC analysis. The reaction mixture was washed twice with 2N HCl and twice with 2N NaOH (100 ml each washing). The organic layer was then dried with magnesium sulfate and the toluene removed by flash evaporation. Methanol was used to remove the last traces of toluene by azetropic distillation. A vacuum was applied to the distilled product (pressure less than one mm for several hours with gentle heating at 50° C. A brown viscous oil, 6.4 g (22% yield) was obtained. The product was analyzed by electo-spray time of flight mass spectroscopy (M+H and M+Na fragments).

EXAMPLE 2

Copolymerization with N-vinyl-2-pyrrolidinone (NVP)

A polymerization mixture containing bis(2-hydroxy-5-vinyl-cyclohexyl) crosslinker (0.044 g), NVP (2 g), glycerin (0.2 g) and Darocur 1173® (0.03 g). A single film was cast against silane treated glass plates with 0.3 mm Teflon spacers. The film was cured under UV light for two hours resulting in a clear hard film that took up a significant amount of water turning into a viscous gel.

EXAMPLE 3

Scheme 2

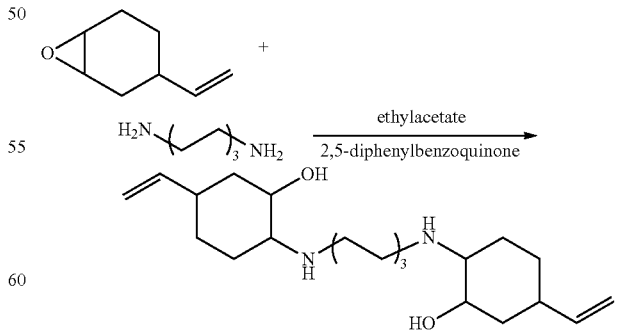

As shown in scheme 2, the reagents, 4-vinyl-1-cyclohexene-1,2-epoxide (12.4 g, 0.1 moles) in 50 mL of anhydrous ethylacetate is slowly added dropwise to a stirring solution of 1,6 diaminohexane (5.81 g, 0.05 moles), anhydrous ethylacetate (50 mL) and 2,5-diphenylbenzoquinone (250 ppm) at 60° C. The addition is made over the course of an hour in order to keep the amine in excess. The 2,5diphenylbenzoquinone is added to inhibit polymerization during the reaction. Progress of the reaction is monitored by gas chromatography (GC) until there is no epoxide present. The reaction mixture is washed twice with 2N HCl and twice with purified water (100 ml each washing). The organic layer is then dried with magnesium sulfate and concentrated by flash evaporation.

EXAMPLE 4

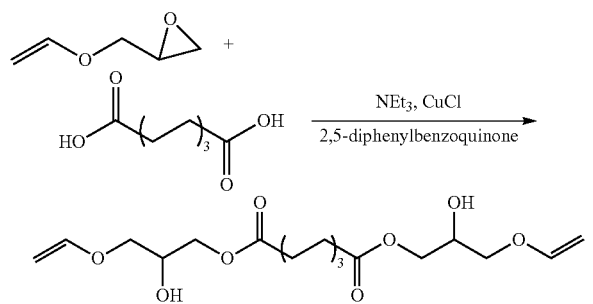

Scheme 3

As shown in scheme 3, the reagents, distilled Allylglycidyl ether (11.4 g, 0.1 moles), suberic acid (13.7 g, 0.07 moles), triethylamine (15.9 g, 0.016 moles) and toluene (60 mL) are combined in a reaction flask equipped with a stir bar, water condenser and drying tube. Cuprous chloride and 2,5-diphenylbenzoquinone (200-500 ppm) are added to inhibit polymerization. The temperature of the reaction flask was controlled with a thermal heating unit. The reaction mixture was heated to 90° C., and the progress of the reaction monitored by gas chromatography (GC). After the epoxide can not be detected by GC analysis the reaction mixture is washed twice with 2N HCl and twice with 2N NaOH (100 ml each washing). The organic layer was then dried with magnesium sulfate and the toluene removed by flash evaporation. Methanol is used to remove the last traces of toluene by azetropic distillation. A vacuum is applied to the product (pressure less than one mm for several hours with gentle heating at 50° C. A viscous oil is obtained.

EXAMPLES 5A AND 5B

Polymerization mixtures containing the bis(2-hydroxy-5-vinyl-cyclohexyl) cross linker of Example 1, monomers and other polymerization components listed in Table 2 were polymerized using polymerization chemistry well known to those of ordinary skill in the art and summarized as follows. The resulting polymeric materials cast into films. Films were cast against silanized glass plates with 0.3 mm Teflon spacers. The films were cured under UV light (3000-3500 μW/cm$^2$) for two hours, and extracted in ethanol for 2 hrs with one solvent change after the first hour. The extraction procedure was repeated with purified water. The films were then placed in borate buffered saline. The transparent films were then tested for mechanical properties on an Instron using ASTM methods 1708 and 1938. The results are contained in the table below.

TABLE 2

| component | 5A | 5B |
|---|---|---|
| TRIS | 43.8 | 35.3 |
| DMA | 2.8 | — |
| NVP | 18.6 | 17.8 |
| Ex. 1 crosslink agent | 2.7 | 1.9 |
| M2D25 | 4.5 | 16.9 |
| Darocure 1173 | 0.3 | 0.3 |
| 1-hexanol | 27.3 | 27.7 |
| properties | | |
| appearance | clear | clear |
| water content, wt. % | 27.1 | 27.4 |
| modulus, g/mm$^2$ | 586 ± 36 | 132 ± 4 |
| tensile, g/mm$^2$ | 154 ± 28 | 73 ± 4 |
| elongation. % | 202 ± 13 | 72 ± 5 |
| tear, g/mm | 65 ± 9 | 10 ± 1 |

We claim:

1. A polymer comprising the reaction product of two or more crosslink agents, a hydrophilic monomer and a lens monomer, wherein at least one of the crosslink agents is of general formula I

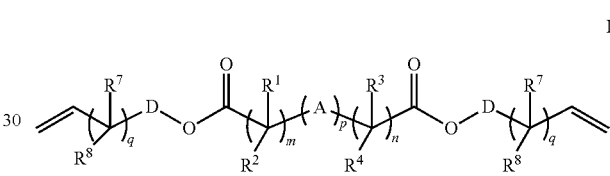

wherein $R^1$, $R^2$, $R^3$, $R^4$, $R^7$ and $R^8$ are independently selected from hydrogen, $C_1$-$C_4$alkyl, $C_1$-$C_2$alkanol or hydroxyl;

A is O, $O(CH_2CH_2O)_v$ or $[SiR^5R^6O]_wSiR^5R^6$, wherein $R^5$ and $R^6$ are independently selected from $C_1$-$C_4$alkyl or phenyl, and v is from 1-20 and w is from 0 to 60;

D is a hydroxyl-substituted straight or branched alkyl with two to eight carbons or a hydroxyl-substituted cyclic hydrocarbon with five to eight ring carbons, wherein one or two of the alkyl or cyclic carbon atoms is optionally substituted for an oxygen atom, sulfur atom or nitrogen radical; and m and n are integers independently selected from 1 to 10; p is 0 or 1; and q is an integer from 0 to 6.

2. The polymer of claim 1 wherein the hydrophilic monomer is selected from the group consisting of N-vinyl pyrrolidone, N-vinyl piperidone, N-vinyl-ε-caprolactam, N-vinylimidazolidone, N-vinylsuccinimide and mixtures thereof.

3. The polymer of claim 1 wherein the lens monomer is selected from the group consisting of 2-hydroxyethyl methacrylate, tris-(trimethylsiloxy)-3-methacryloxypropylsilane, dimethylacrylamide, ethylene glycol dimethacrylate, methacrylic acid, 2-phenylethyl acrylate, 2-phenoxyethyl acrylate, 2-phenoxyethyl methacrylate, triethylene glycol dimethacrylate, tetraethylene glycol dimethacrylate, isobornyl methacrylate, 2-methoxyethyl methacrylate, glycerol monomethacrylate, monomethoxy polyethyleneglycol methacrylates and any mixture thereof.

4. The polymer of claim 2 wherein the lens monomer is selected from the group consisting of 2-hydroxyethyl methacrylate, tris-(trimethylsiloxy)-3-methacryloxypropylsilane, dimethylacrylamide, ethylene glycol dimethacrylate, methacrylic acid, 2-phenylethyl acrylate, 2-phenoxyethyl acrylate, 2-phenoxyethyl methacrylate, triethylene glycol dimethacrylate, tetraethylene glycol dimethacrylate, isobornyl methacrylate, 2-methoxyethyl methacrylate, glycerol monomethacrylate, monomethoxy polyethyleneglycol methacrylates and any mixture thereof.

5. The polymer of claim 1 wherein the lens monomer is a silicone-containing monomer or macromonomer to provide a siloxane polymer for the manufacture of an ophthalmic lens material.

6. The polymer of claim 5 wherein the silicon-containing monomer or macromonomer is of Structure A

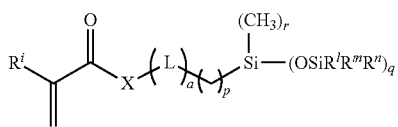

wherein $R^i$ is H or $CH_3$, q is 1 or 2 and for each q, $R^l$, $R^m$ and $R^n$ are independently selected from ethyl, methyl, benzyl, phenyl or a monovalent siloxane chain comprising from 1 to 30 repeating Si—O units, p is an integer from 1 to 10, r is (3 - q), X is O, NH or $N(C_{1-4}alkyl)$, a is 0 or 1, and L is a divalent linking group optionally include ether or hydroxyl functionality.

7. The polymer of claim 5 wherein the silicon-containing monomer or macromonomer is selected from the group consisting of (3-methacryloyloxypropyl)-bis(trimethylsiloxy) methylsilane, (3-methacryloyloxypropyl)-pentamethyldisiloxane, and (3-methacryloyloxy-2-hydroxypropyloxy)bis(trimethylsiloxy) methylsilane.

8. The polymer of claim 5 wherein the silicon-containing monomer or macromonomer is of Structure B

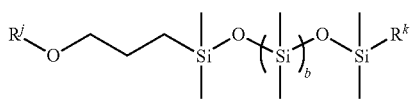

where b=0 to 100, and $R^k$ is selected from any $C_{1-10}$ aliphatic or aromatic group which can include hetero atoms, and a $C_{3-8}$ alkyl group; and $R^j$ is an ethylenically unsaturated moiety.

9. The polymer composition of claim 1 wherein the hydrophilic monomer and the lens monomer have a reactivity ratio, $R_H/R_L$, greater than 10 or less than 0.1, the reactivity ratio, $R_H/R_L$, defined by the following radical polymerization reactions, wherein $M_h$ represents the hydrophilic monomer, $M_h^*$ represents the hydrophilic monomer radical, $M_l$ represents the lens monomer, $M_l^*$ represents the lens monomer radical, $M_i$ represents the crosslink agent, and $M_i^*$ represents the crosslink agent radical, $M_h^*+M_h \rightarrow M_hM_h^* k_{hh}$;

$M_h^*+M_i \rightarrow M_hM_i^* k_{hi}$;

$M_i^*+M_i \rightarrow M_iM_i^* k_{ii}$;

$M_i^*+M_h \rightarrow M_iM_h^* k_{ih}$; and $R_H$ is $R_h/R_i$, and $M_l^*+M_l \rightarrow M_lM_l^* k_{ll}$;

$M_l^*+M_i \rightarrow M_lM_i^* k_{li}$;

$M_i^*+M_i \rightarrow M_iM_i^* k_{ii}$;

$M_i^*+M_l \rightarrow M_iM_l^* k_{il}$; and $R_L$ is $R_l/R_i$, wherein the hydrophilic monomer has a reactivity ratio $R_h = k_{hh}/k_{hi}$, the lens monomer has a reactivity ratio $R_l = k_{ll}/k_{li}$, and the crosslink agent has a reactivity ratio $R_i = k_{ii}/k_{ih}$.

10. The polymer composition of claim 5 wherein the hydrophilic monomer and the lens monomer have a reactivity ratio, $R_H/R_L$, greater than 10 or less than 0.1, the reactivity ratio, $R_H/R_L$, defined by the following radical polymerization reactions, wherein $M_h$ represents the hydrophilic monomer, $M_h^*$ represents the hydrophilic monomer radical, $M_l$ represents the lens monomer, $M_l^*$ represents the lens monomer radical, $M_i$ represents the crosslink agent, and $M_i^*$ represents the crosslink agent radical, $M_h^*+M_h \rightarrow M_hM_h^* k_{hh}$;

$M_h^*+M_i \rightarrow M_hM_i^* k_{hi}$;

$M_i^*+M_i \rightarrow M_iM_i^* k_{ii}$;

$M_i^*+M_h \rightarrow M_iM_h^* k_{ih}$; and $R_H$ is $R_h/R_i$, and $M_l^*+M_l \rightarrow M_lM_l^* k_{ll}$;

$M_l^*+M_i \rightarrow M_lM_i^* k_{li}$;

$M_i^*+M_i \rightarrow M_iM_i^* k_{ii}$;

$M_i^*+M_l \rightarrow M_iM_l^* k_{il}$; and $R_L$ is $R_l/R_i$, wherein the hydrophilic monomer has a reactivity ratio $R_h = k_{hh}/k_{hi}$, the lens monomer has a reactivity ratio $R_l = k_{ll}/k_{li}$, and the crosslink agent has a reactivity ratio $R_i = k_{ii/kih}$.

11. The polymer composition of claim 1 wherein D is a hydroxyl-substituted cyclic hydrocarbon.

12. The polymer composition of claim 11 wherein the at least one of the crosslink agents of general formula I with p=0 and is of general formula II

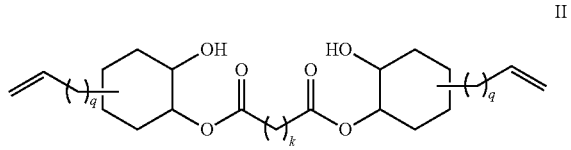

wherein k is 2 to 12 and q is 0, 1 or 2.

13. The polymer composition of claim 11 wherein p is 1, A is $[SiR^5R^6O]_wSiR^5R^6$, and m+n is from 2 to 10.

14. The polymer composition of claim 11 wherein p is 1, A is $O(CH_2CH_2O)_v$ and m+n is from 2 to 10.

15. The polymer composition of claim 1 wherein D is a hydroxyl-substituted straight or branched alkyl.

16. The polymer composition of claim 15 wherein p is 1, A is $[SiR^5R^6O]_wSiR^5R^6$, and m+n is from 2 to 10.

17. The polymer composition of claim 15 wherein p is 1, A is $O(CH_2CH_2O)_v$ and m +n is from 2 to 10.

* * * * *